April 19, 1966     R. A. KITZMANN     3,247,340

ANGULAR DISPLACEMENT DETECTION APPARATUS

Filed Oct. 21, 1964     2 Sheets-Sheet 1

INVENTOR.
Ronald A. Kitzmann
BY
Hugh L. Fisher
ATTORNEY

April 19, 1966 R. A. KITZMANN 3,247,340
ANGULAR DISPLACEMENT DETECTION APPARATUS
Filed Oct. 21, 1964 2 Sheets-Sheet 2

INVENTOR.
Ronald A. Kitzmann
BY
Hugh L. Fisher
ATTORNEY

United States Patent Office 3,247,340
Patented Apr. 19, 1966

3,247,340
ANGULAR DISPLACEMENT DETECTION
APPARATUS
Ronald A. Kitzmann, West Acton, Mass., assignor to General Motors Corporation, Detroit, Mich., a corporation of Delaware
Filed Oct. 21, 1964, Ser. No. 405,520
8 Claims. (Cl. 200—61.46)

This invention relates to apparatus for detecting angular displacement between relatively rotatable members and, more particularly, to such apparatus including a helical camming groove formed in a surface of one of the members and one or more switch means disposed on the other member and having a follower-type actuator extending into the groove and responsive to the depths thereof to condition the switch means accordingly.

A need often arises to detect the angular displacement of a rotatable body as measured from a reference position. In many instances, it is further desirable to maintain this indication over a fairly large angular displacement, especially where the total angular travel of the body may exceed 360°. Further, it may be desirable to have the capacity to modify the signal from the detection apparatus at any point over a large angular displacement without ambiguity which might arise out of returning the detection apparatus to a position which corresponds to the reference position after a 360° rotation.

According to the present invention, it is possible to detect the angular displacement of a relatively rotatable body and to either maintain or modify this indication over a large angular displacement; for example, that exceeding 360°. This may be accomplished through the provision of a member having at least one substantially cylindrical surface which is symmetrically disposed about an axis of relative rotation and having formed in the surface a helical groove which is disposed about the axis, which groove includes contiguous portions of differing depths. The combination further includes at least one switch means having two switching states, and support means for mounting the switch adjacent the cylindrical surface, and means for permitting relative rotation to take place about the axis between the member and the support means. The switch means includes a follower-type actuator which extends into the groove and rides therein during relative rotation. The switch means is responsive to the radial position of the actuator such that the varying depths of the groove are effective to condition the switch means as between the states. In addition, means are provided for permitting axial movement of the actuator during the relative rotation to compensate for the axial displacement occasioned by the helixity of the groove.

In many instances, it is desirable to detect the rotational displacement of a relatively rotatable body, such as the inertial platform of an inertial guidance system. While this may generally be accomplished through gimbals, it may be desirable to provide additional rotational displacement detection of a multi-gimbaled platform without the addition of extra gimbals. In accordance with the present invention, this may be accomplished by mounting a first body on one of the gimbals so as to be displaced therewith. A groove is provided in a surface of the body, which groove is helically disposed about an axis of rotation. The groove is provided with first and second contiguous portions of distinct radial depths. In accordance with the invention, first and second switching means may be supported on a second body attached to another gimbal. Each of the switching means has first and second switching states and is supported adjacent the groove surface. Each of the switch means is provided with an actuator which is pivotally mounted thereon and includes a follower portion extending into the groove such that the depth of the groove proximate the follower determines the condition of the associated switch. The first and second switch means may be circumferentially spaced about the grooved surface such that the follower means thereof normally extend into the first and second portions of the groove respectively, whereby rotation of the member effects the change in state in one of the switch means which is a positive indication of the initial direction of rotation. Each of the follower means is adapted to allow for lateral motion to account for the helixity of the groove during said rotation.

The objects and advantages of the invention as described above, as well as other objects and advantages will become more apparent upon reading of the following specification which describes an illustrative embodiment of the invention and which is to be taken with the accompanying drawings of which:

Figure 1:
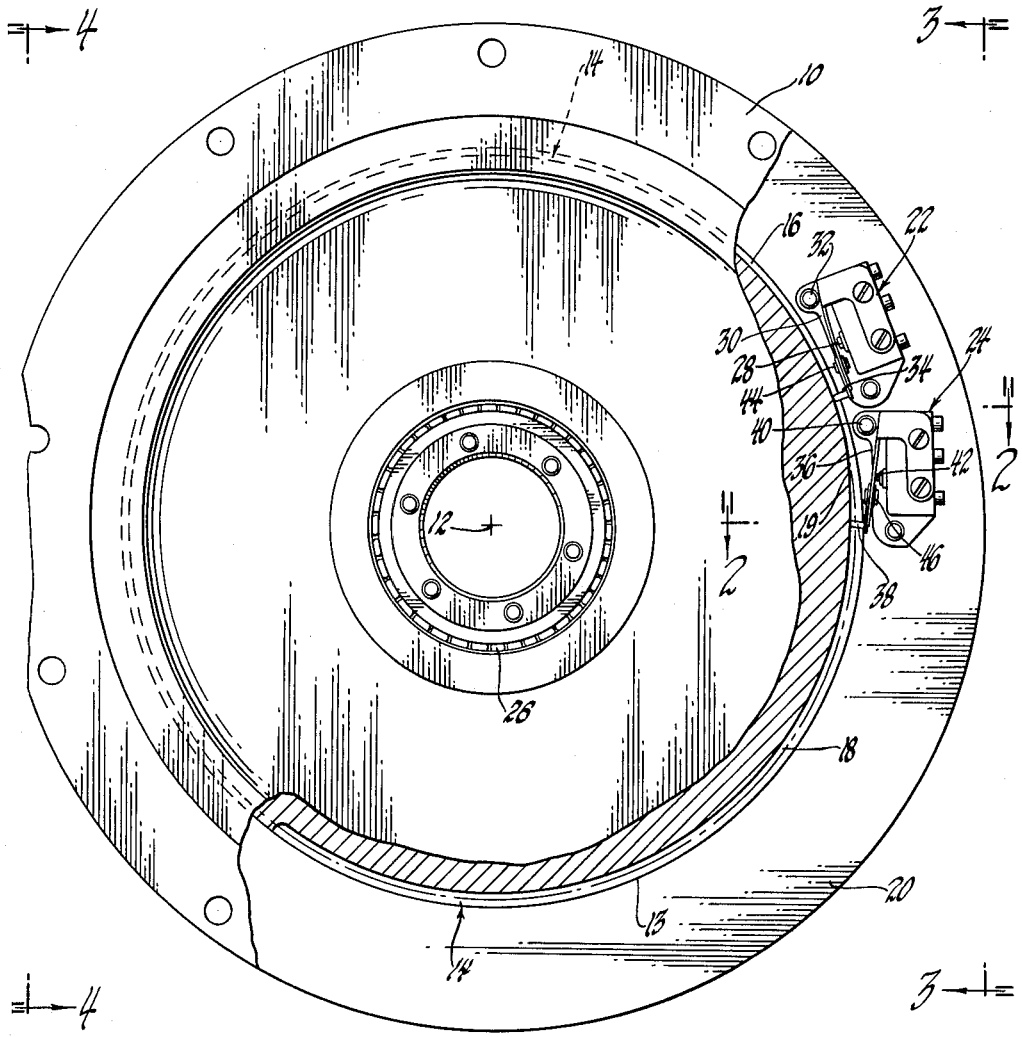
FIGURE 1 is a partially sectioned view of apparatus for detecting angular displacement of an inertial platform as well as the direction of displacement.

Referring now to the figures, there is shown the housing 10 of a torque motor. This torque motor housing 10 may be attached to the outer or support gimbal of a three-gimbal system supporting an inertial platform. The housing 10 forms part of an assembly which is symmetrical about an axis 12 which extends normal to the plane surface of the housing as shown in FIGURE 1. As is better shown in FIGURES 2 and 3, the housing 10 is provided with a substantially cylindrical surface 13 within which is formed a helical grove 14 having contiguous portions 16 and 18. As can best be seen in the partially sectioned view of FIGURE 1, portion 18 of the groove 14 is substantially deeper than portion 16. The two contiguous portions 16 and 18 merge at a point which is approximately indicated at 19.

Figure 2:
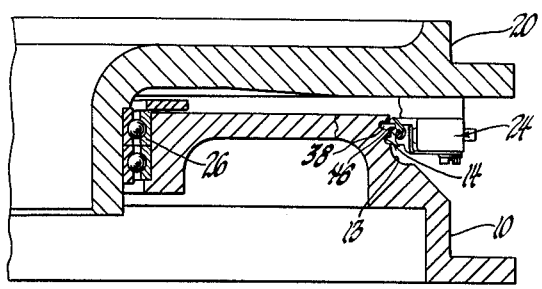
FIGURE 2 is a sectional view of the apparatus taken along a section line 2—2 of FIGURE 1.

A substantially cylindrical pivot plate 20 may be attached to the middle gimbal of a three-gimbal system. It should be noted that the housing 10 and pivot plate 20 may be attached to the middle and inner gimbals, respectively, of a three-gimbal system should conditions require such connection. Bearing means 26 shown in FIGURE 2 are provided to permit relative rotation between the housing 10 and the pivot plate 20 about the axis 12 of the assembly. The bearing 26 may take the form of a high quality ball-type bearing.

Mounted on the pivot plate 20 are two switches 22 and 24. The switches 22 and 24 are circumferentially spaced on the plate 20 as shown and mounted so as to be adjacent the groove 14 in the housing 10. Each of the switches 22 and 24 is capable of being conditioned in one of two switching states by actuating apparatus which is operatively associated with the groove 14 in the cylindrical surface 13 of the housing 10. This actuating apparatus is substantially the same on each of the switches 22 and 24. Referring to switch 22, for example, the apparatus includes a depressible plunger 28 which is displaceable in a radial direction with respect to the end cap 10 to determine the condition of the switch 22 in accordance with the extent to which the plunger 28 is displaced. An actuator arm 30 is pivotally mounted to the body of the switch 22 by means of a pivotal connection 32. The actuator arm 30 includes a follower portion 34 which extends into the groove 14 to ride therein during rotation of the housing 10 relative to the plate 20. The pivotal connection 32 allows the actuator arm 30 to be displaced radially with respect to the surface 13 of the housing 10 in accordance with the depths of the groove 14 proximate the follower portion 34. As shown in FIGURE 1, the actuator arm bears against the plunger 28 to depress same to an extent corresponding with the depth of the groove proximate the follower portion 34. Switch 24 is also provided with an actuator arm 36 having a follower portion 38 and being pivotally mounted on the body of the switch 24 by means of a pivotal connection 40. The actuator arm 36 bears against a plunger 42 which operates to condition the switch 24 in the same manner as the plunger 28 conditions switch 22.

Figure 3:
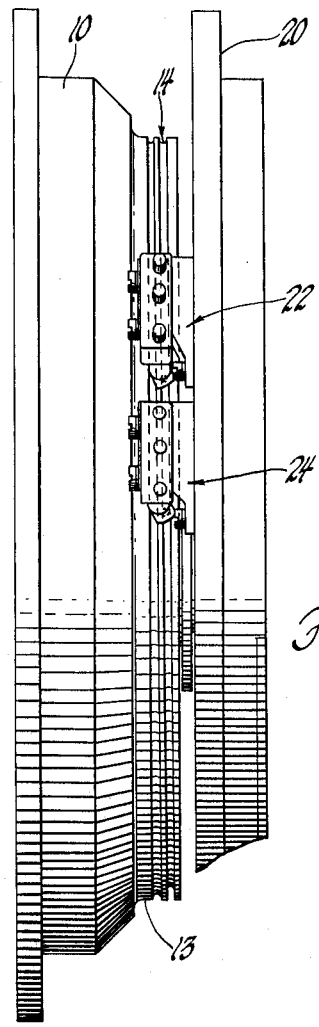
FIGURE 3 is a side view of the angular detection apparatus shown in FIGURE 1.
Figure 4:
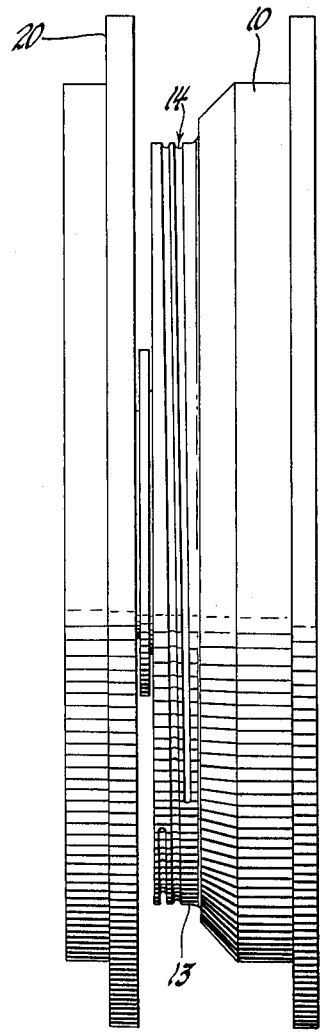
FIGURE 4 is a side view of a portion of the apparatus shown in FIGURE 1.
Figure 5:
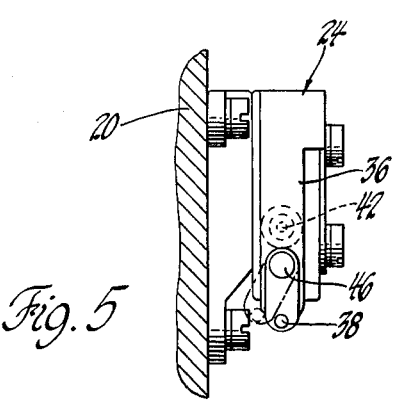
FIGURE 5 is a detailed view of one of the switching means employed in the invention shown in FIGURES 1 through 4.

As best shown in FIGURES 3 and 4 the groove 14 extends for substantial angular distances on either side of the central point 19 shown in FIGURE 1. According to the particular requirements of the apparatus shown in FIGURE 1, the groove 14 extends for 550° in one direction of point 19 and for approximately 120° in the opposite direction. Accordingly, it can be seen that due to the helixity of the groove 14 and the substantial length thereof about the surface 13 of the housing 10, axial movement of the actuator arms 30 and 36 of the switches 22 and 24 is produced during rotation of housing 10. This axial movement must be allowed for to permit proper operation of the switches 22 and 24 over the desired range. Accordingly, as best shown in FIGURE 5, the follower portion 34 of switch 22, for example, is pivotally connected to the remainder of the actuator arm 30 by means of a pivotal connection 44. A similar pivotal connection 46 is provided in the actuator arm 36 of switch 24. As shown in the drawings, these pivotal connections 44 and 46 permit axial displacement of the actuator arms 30 and 36 of the switches 22 and 24, which is occasioned by rotation of the housing 10 relative to the plate 20.

A brief description of the operation of the assembly shown in the figures will now be made. Initially, the gimbal attached to housing 10 may be disposed in a reference position. Displacement from this reference position in either direction must be detected and the detection must be maintained over substantial angular displacements. The reference position determines the disposition of the groove 14 and the central point 19 thereof, as well as the circumferential disposition of the switches 22 and 24. This reference position is substantially as illustrated in FIGURE 1. It can be seen that the follower portion 34 of switch 22 extends into the relatively shallow portion 16 of the groove 14 while the follower portion 38 of switch 24 extends into the relatively deep portion 18 of the groove 14. The central point 19 is approximately intermediate the follower portions 34 and 38 of the switches 22 and 24 respectively. Accordingly, rotation of the housing 10 in either direction through an angle of approximately 10° is effective to displace one of the followers 34 or 38 from one portion of the groove to another portion of different radial depth, thus placing one of the switches in a different condition from that which obtains while the apparatus is at rest in the reference position shown in FIGURE 1. For example, counterclockwise rotation of the housing 10 from the reference position shown in FIGURE 1 is effective to displace follower portion 34 of switch 22 into the relatively deep portion 18 of the groove 14, allowing the plunger 28 to become extended, thus changing the condition of switch 22. However, follower portion 38 of switch 24 continues to ride in the deep portion 18 of the groove 14 and no change in state of the switch is occasioned. Obviously the switches may be wired so as to be normally in either state. It can be seen from the FIGURES 3 and 4, for example, that during the relative rotation of the housing 10 which may insue after the initial displacement, the indication of the angular displacement which is provided by switch 22, for example, is maintained over the entire length of the groove due to the provision for axial displacement of the follower portion 34 which is provided by the pivot 44.

Further additions and modifications may be made to the invention as described above. For example, additional camming surfaces may be placed at various points throughout the angular extent of the groove 14 to provide various readings in accordance with the particular needs of the particular application. This suggestion by no means exhausts the number of modifications and additions which may be made to the present invention and, therefore, should not be construed in a limiting sense. For a definition of the invention, reference should be had to the appended claims.

What is claimed is:

1. Angular displacement detection apparatus comprising the combination of a member having at least one substantially cylindrical surface symmetrically disposed about an axis, the surface having formed therein a helical groove disposed about the axis, the groove including a first portion of a first depth and a contiguous second portion of a depth which varies substantially from that of the first portion, switch means having two switching states, support means for mounting the switch means adjacent the cylindrical surface, means for permitting relative rotation between the member and the support means about said axis, the switch means including actuator means pivotally mounted thereon and responsive to the radial position thereof relative to the surface for conditioning the switch means and including a follower portion extending into the groove and riding therein during relative rotation to place the switch means in one of the states according to the depth of the groove proximate the follower portion, and means for permitting axial movement of the follower means during relative rotation.

2. Angular displacement detection apparatus comprising the combination of a member mounted for rotation about an axis and having a substantially circular cross-section normal to said axis, the member having formed therein a helical groove disposed about the axis of rotation, the groove including a first portion of substantially uniform depth and a second portion of a depth which varies substantially from the first portion, switch means having two conditions and being mounted adjacent said member, actuator means for the switch means including follower means having a portion extending into said groove, means for permitting pivotal motion of the follower means with respect to the switch means both in the direction of the helix of the groove and radially with respect to the axis of said member, the switch means being responsive to the radial position of the actuator means relative to the member to be placed in one of said conditions corresponding to the depth of the groove proximate the follower means.

3. Angular displacement detection apparatus comprising a rotatable member having a cylindrical surface symmetrically disposed about an axis of rotation, the surface having formed therein a groove helically disposed about the axis and having first and second contiguous portions of distinct depth, switch means having first and second switching states, stationary support means for mounting the switch means adjacent the surface, the switch means including actuator means pivotally mounted thereon for selecting the state thereof in accordance with the radial position of the actuator means with respect to the surface, the actuator means including a follower portion extending into the groove and means for permitting radial displacement thereof relative to the surface, and pivot means for permitting axial motion of the actuator means relative to the surface whereby angular displacement of the member relative to the support means sufficient to move the follower portion from one groove portion to the other changes the state of the switch means.

4. Angular displacement detection apparatus comprising a rotatable member having a cylindrical surface symmetrically disposed about an axis of rotation, the surface having formed therein a groove helically disposed about the axis and having first and second contiguous portions of distinct radial depth, first and second switch means each having first and second switching states, support means for mounting the switch means adjacent the surface, each of the switch means having actuator means pivotally mounted thereon and including a follower portion extending to the groove and responsive to the depth of the groove proximate the follower to radially displace the actuator means relative to the surface to place the switch means in one of the states and pivot means for permitting axial motion of the actuator means during rotation of the member, the first and second switch means being circumferentially spaced about the surface of the member such that the follower means thereof normally extend into the first and second portions of the groove, respectively, whereby rotation of the member effects a change in state in one of the switch means corresponding to the direction of rotation.

5. Apparatus for detecting angular displacement of an inertial platform having a multi-gimbal support system comprising a first body adapted to be mounted to one gimbal of said support system so as to be rotatable about an axis and having a cylindrical surface coaxial therewith, the surface having formed therein a groove helically disposed about the axis and having first and second contiguous portions of distinct depth, support means adapted to be mounted to another gimbal of said support system, switch means mounted on the support means adjacent the surface and having first and second switching states, the switch means having actuator means pivotally mounted thereon and including a follower portion extending into the groove, the switch means being responsive to the radial position of the actuator means relative to the surface to be placed in one of the states thereby to indicate movement of the follower portion from one of the groove portions to the other, and pivot means operatively associated with the actuator means for permitting axial movement thereof relative to the first body during angular displacement of the body about the axis.

6. Apparatus for detecting angular displacement of an inertial platform having at least two supporting gimbals comprising a first body adapted to be mounted to one gimbal for rotation about an output axis and having a cylindrical surface coaxial therewith, the surface having formed therein a groove helically disposed about the axis and having first and second contiguous portions of distinct depth, a second body adapted to be mounted to another gimbal, first and second switch means each having first and second switching states and being mounted on the second body adjacent the surface, each of the switch means having actuator means pivotally mounted thereon including a follower portion extending into the groove, the switch means being responsive to the radial position of the actuator means relative to the surface to be placed in one of the states corresponding to the depth of the groove proximate the follower, pivot means operatively associated with each of the actuator means for permitting axial movement thereof relative to the first body during angular displacement thereof, the first and second switch means being circumferentially spaced about the surface of the first body such that the follower means thereof normally extend into the first and second portions of the groove, respectively, whereby relative rotation of the first body effects a change in state in one of the switch means corresponding to the direction of rotation.

7. In combination, a member mounted for rotation about an axis and having a substantially cylindrical surface coaxial therewith, the surface having formed therein a groove helically disposed about the axis, the groove having portions of varying depths, a switch having two switching states and a plunger member for selecting the states in accordance with the displacement thereof, support means for mounting the switch adjacent the surface, an actuator arm pivotally mounted on the switch having a follower extending into the groove, the arm bearing against the plunger member for displacing the plunger member according to the depth of the groove proximate the plunger member, and pivot means in the actuator arm for permitting axial movement thereof relative to the member during rotation thereof.

8. In combination, a member mounted for rotation about an axis and having a substantially cylindrical surface coaxial therewith, the surface having formed therein a groove helically disposed about the axis, the groove having portions of varying depths, first and second switches each having two switching states and a plunger member for selecting the states in accordance with the displacement thereof, support means for mounting the switches adjacent the surface, each of the switches having an actuator arm pivotally mounted thereon including a follower extending into the groove, the arm bearing against the plunger member for displacing the plunger member according to the depth of the groove proximate the plunger member, and pivot means in each of the actuator arms for permitting axial movement thereof relative to the member during rotation thereof, the first and second switches being circumferentially spaced about the surface such that the followers thereof normally extend into groove portions of different depth whereby rotation of the member effects a change in state in at least one of the switches.

No references cited.

BERNARD A. GILHEANY, *Primary Examiner.*